UNITED STATES PATENT OFFICE.

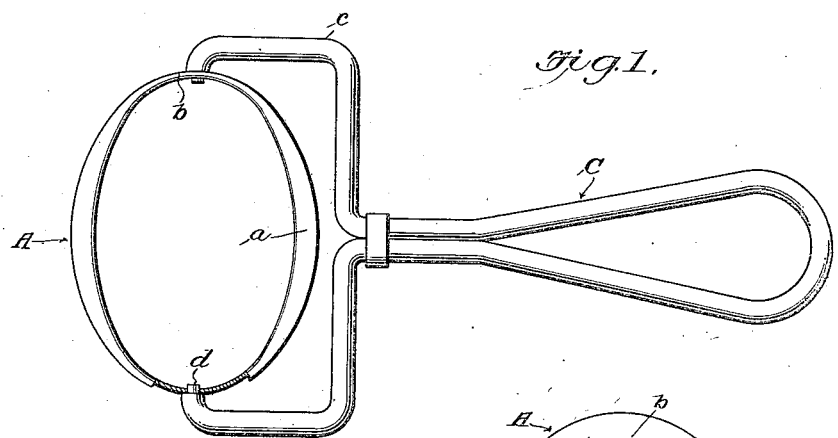
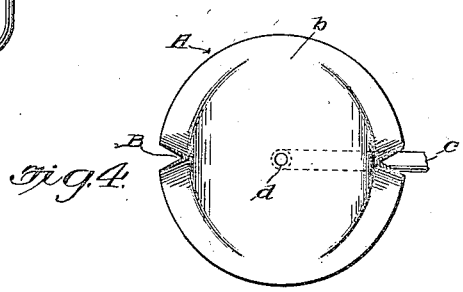
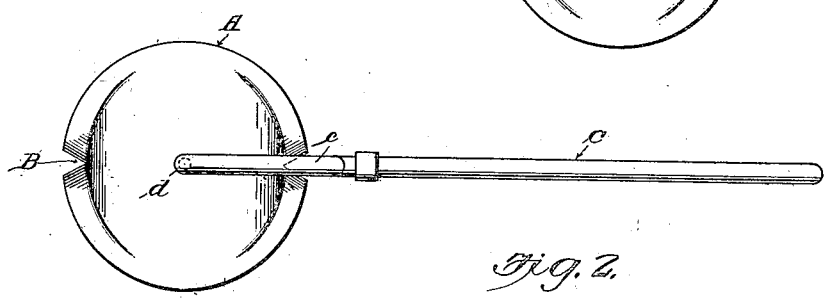
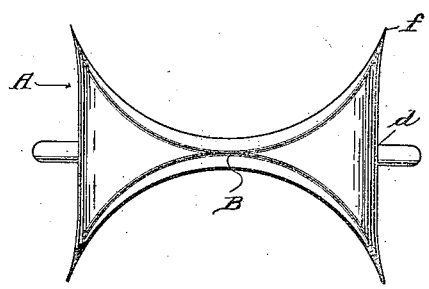

BENJAMIN S. WILLIAMS, OF NASHVILLE, TENNESSEE.

CAKE OR BISCUIT CUTTER.

1,421,749. Specification of Letters Patent. Patented July 4, 1922.

Application filed December 6, 1921. Serial No. 520,349.

*To all whom it may concern:*

Be it known that BENJAMIN S. WILLIAMS, a citizen of the United States, residing at Nashville, in the county of Davidson and State of Tennessee, has invented certain new and useful Improvements in Cake or Biscuit Cutters, of which the following is a specification.

This invention contemplates the construction of a cake or biscuit cutter of two units,—i. e., a cutter unit and a handle or carrier unit, the former being stamped or otherwise formed from suitable sheet metal and the latter being bent from metal rod or wire to form a handle and bearing for the former.

More specifically the device includes a cutter formed from sheet tubing of suitable material having outwardly flaring cutting edges and a handle formed of wire bent upon itself and terminating in offset bearing portions.

The object of this invention is to provide a device of the type described of the most simple construction, cheap to manufacture and convenient to manipulate.

Reference will be had to the accompanying drawings forming a part of this specification and wherein like numerals of reference designate corresponding parts throughout the several views, in which:—

Figure 1 is a plan view.

Figure 2 is a side elevation.

Figure 3 is an end view, and

Figure 4 is a transverse section through the cutter.

Referring now to the detailed construction reference character A indicates the cutter body which comprises a section of elliptical sheet material suitable for the construction of culinary implements. The length of the tubular body A gradually decreases towards the wider portion as indicated by reference B Figure 3 and the cutting edge is flared outwardly, the flare increasing gradually to a point forming the shortest wall length (see reference character *a*).

It will be obvious from an examination of the sectional view (Figure 4) that the vertical wall of the body practically becomes nil at the point of its greatest width B and that at this point the flaring wall portions are in the form of a V, the apexes of which are directed inwardly towards the longitudinal axis of the body.

Referring again to the flaring cutting edge it will be noted that the narrow ends of the elliptical body, at which point the walls of the body are the longest, flare very slightly as shown at *b*. This variance in the cutting edge together with the length of the body wall not only permits the cutting of circular dough sections upon rotation but provides a strong reinforced article with the utilization of as small a unit of material as possible. In addition to the foregoing, manufacture of this element merely resides in the single stamping operation.

The handle is shown consisting of a single piece of wire or like material bent upon itself to form the gripping portion C. The terminals being bent outwardly and forwardly to form the widened portion *c* the ends of which are reduced and project inwardly to form the bearings *d*. These bearings *d* are seated in suitable opening formed at the transverse axis of the body.

The present invention has eliminated the use of numerous parts in the construction of bread or cake cutters and has provided a strong and durable device which can be manufactured from two parts by merely the stamping and bending operations, the former operation on the cutter body and the bending operation on the handle.

What I claim as new and useful and desire to secure by Letters Patent, is:—

1. A cutter of the type described comprising a body of elliptical tubing having flaring outer edges, and a carrier comprising a handle and bearings engaging the transverse axis of said body.

2. A device of the class described comprising a body of elliptical tubing having flaring cutting edges, the wall of said body being of gradually decreasing length towards the greater width and the flare of the cutting edge increasing.

3. A device of the class described comprising a body formed of a single piece of elliptical tubing having continuous flaring cutting edges, the length of said tubing being gradually decreased towards the wider portion of said tubing and the flare increasing at such parts.

4. In a cutter of the type described comprising a body formed of integral tubing having continuous flaring cutting edges, and a handle formed of a single piece of metal bent upon itself near its center and having offset inwardly projecting bearing portion extending into suitable openings formed in said body.

5. A device of the class described comprising a body formed from an elliptical section of sheet tubing the edges of which are flared outwardly, the flare increasing both as to angle and width towards the wider part of said body, the wall forming said body decreasing from the narrow end of said body towards the wider point and becoming practically nil thereby permitting the flaring cutting edges to join forming an inwardly directed V at each side, and a carrier for said body.

In testimony whereof I affix my signature.

BENJAMIN S. WILLIAMS.